(12) United States Patent
Garrard et al.

(10) Patent No.: US 9,941,771 B2
(45) Date of Patent: Apr. 10, 2018

(54) ELECTRIC MOTOR ROTOR WITH EXTENDED SHOULDERS FOR BEARINGS

(71) Applicant: BorgWarner Inc., Auburn Hills, MI (US)

(72) Inventors: Tyler Ransom Garrard, Arden, NC (US); Frederick M. Huscher, Hendersonville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/259,618

(22) Filed: Sep. 8, 2016

(65) Prior Publication Data
US 2018/0069451 A1    Mar. 8, 2018

(51) Int. Cl.
*H02K 1/28* (2006.01)
*H02K 7/08* (2006.01)
*F02B 37/10* (2006.01)

(52) U.S. Cl.
CPC .............. *H02K 7/08* (2013.01); *F02B 37/10* (2013.01); *H02K 1/28* (2013.01)

(58) Field of Classification Search
CPC ....... H02K 1/2726; H02K 1/2733; H02K 1/28
See application file for complete search history.

(56) References Cited

U.S. PATENT DOCUMENTS

| | | | | |
|---|---|---|---|---|
| 4,701,651 A | * | 10/1987 | Tanaka | F16C 21/00 310/90 |
| 5,471,104 A | * | 11/1995 | Toshimitsu | F16C 17/107 310/67 R |
| 5,801,470 A | * | 9/1998 | Johnson | H02K 1/2733 310/156.27 |
| 5,821,647 A | * | 10/1998 | Takehara | G02B 26/121 310/156.05 |
| 6,989,618 B2 | * | 1/2006 | Fukuyama | F16C 19/14 310/67 R |
| 7,049,723 B2 | * | 5/2006 | Suzuki | H02K 29/03 310/156.12 |
| 8,040,007 B2 | * | 10/2011 | Petrov | H02K 1/02 310/156.27 |
| 2015/0118044 A1 | | 4/2015 | Hippen et al. | |
| 2015/0171675 A1 | * | 6/2015 | Carrasco | H02K 1/274 310/156.12 |
| 2016/0003140 A1 | | 1/2016 | Garrard et al. | |

FOREIGN PATENT DOCUMENTS

WO    2015061767 A1    4/2015

* cited by examiner

*Primary Examiner* — Dang Le
(74) *Attorney, Agent, or Firm* — BrooksGroup

(57) ABSTRACT

A number of variations may include a product comprising: a rotor core comprising a body, wherein the body includes an inner surface and an outer surface, a first end cap which extends radially from a first end of the body and a second end cap which extends radially from a second end of the body, wherein the first end cap, the second end cap, and the outer surface define an annular cavity; at least one sleeve adjacent at least one of the first end cap or the second end cap; at least one magnet contained within the annular cavity; and at least one bearing operatively attached to the at least one sleeve.

17 Claims, 5 Drawing Sheets

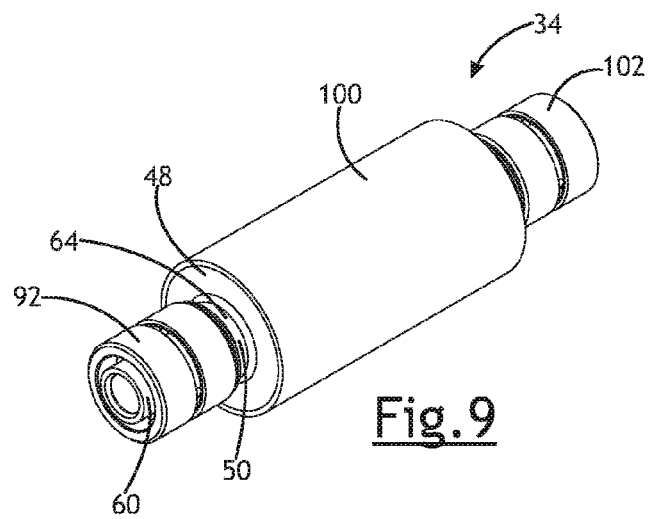
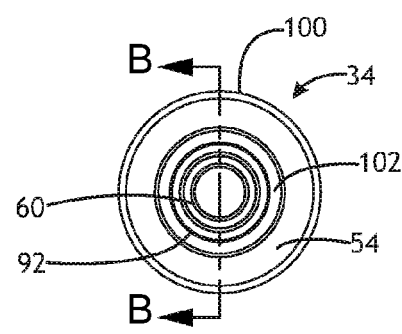
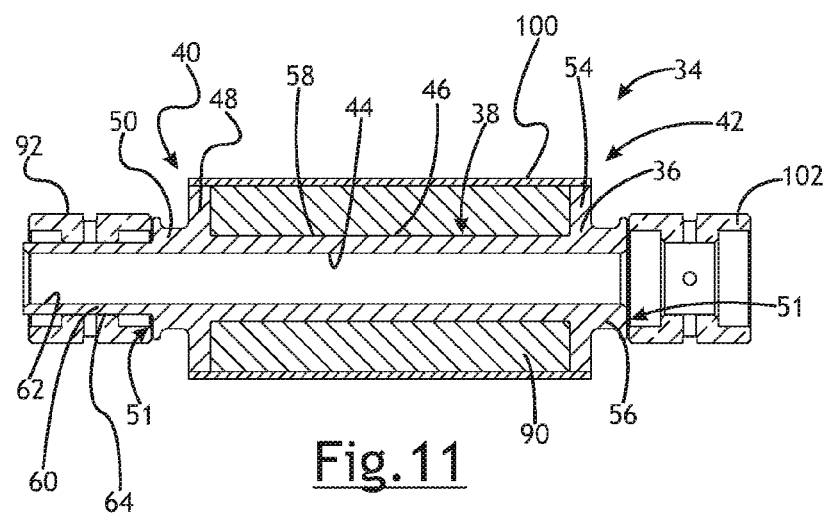
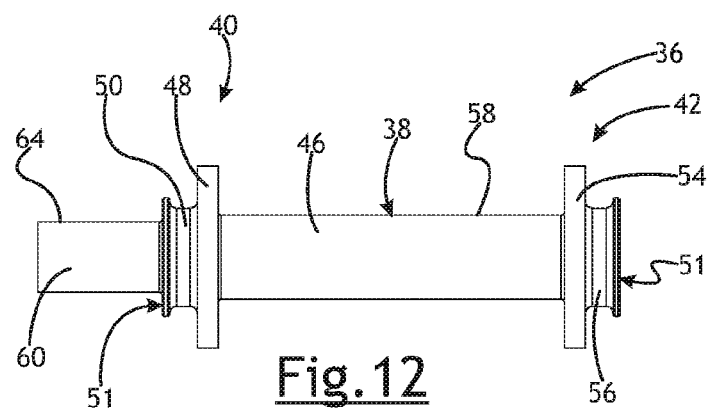

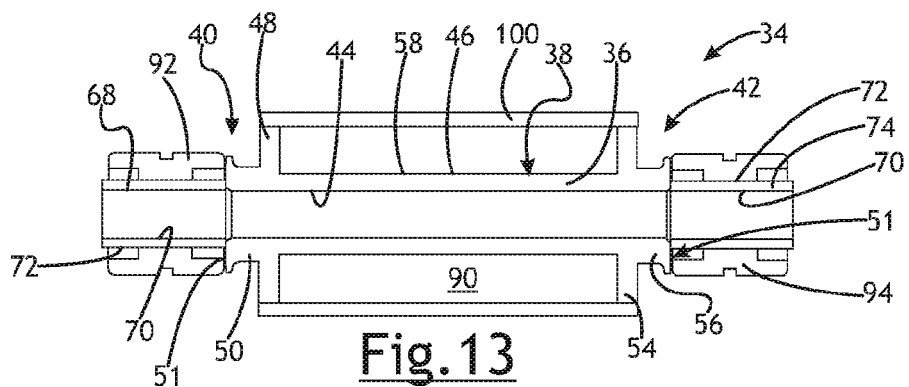
Fig. 13
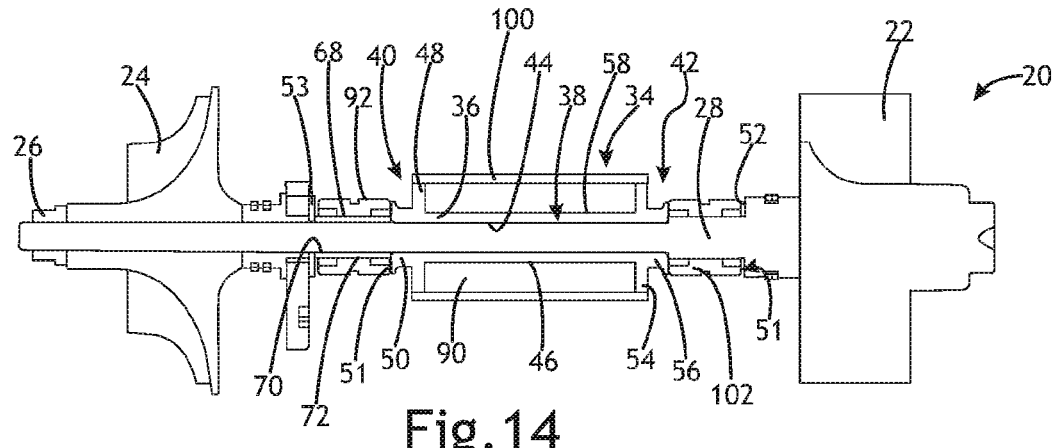
Fig. 14
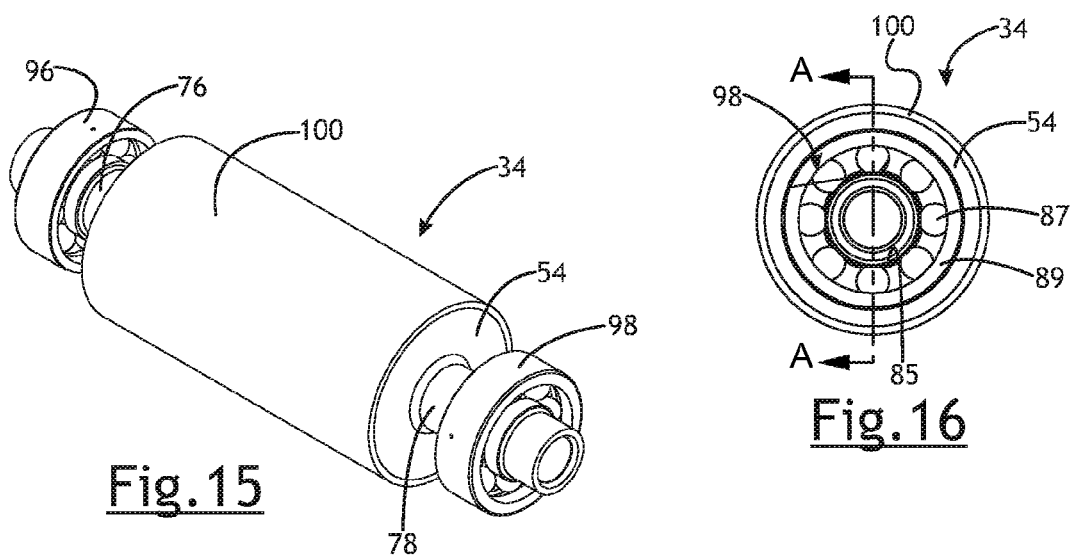
Fig. 15
Fig. 16

US 9,941,771 B2

ELECTRIC MOTOR ROTOR WITH EXTENDED SHOULDERS FOR BEARINGS

TECHNICAL FIELD

The field to which the disclosure generally relates to includes electric motors.

BACKGROUND

Electrified turbomachinery may include an electric motor.

SUMMARY OF ILLUSTRATIVE VARIATIONS

A number of variations may include a product comprising: a rotor core comprising a body, wherein the body includes an inner surface and an outer surface, a first end cap which extends radially from a first end of the body and a second end cap which extends radially from a second end of the body, wherein the first end cap, the second end cap, and the outer surface define an annular cavity; at least one sleeve adjacent at least one of the first end cap or the second end cap; at least one magnet contained within the annular cavity; and at least one bearing operatively attached to the at least one sleeve.

A number of variations may include a rotor assembly comprising: a rotor core comprising: a body, wherein the body is cylindrical and includes an inner surface and an outer surface; a first end cap which extends radially from a first end of the body and a second end cap which extends radially from a second end of the body; an annular cavity defined by a portion of the outer surface of the body, an inner surface of the first end cap, and an inner surface of the second end cap; at least one bearing sleeve adjacent the first end cap or the second end cap, wherein the at least one bearing sleeve is a bearing surface; at least one magnet within the annular cavity; and a rotor sleeve surrounding the annular cavity.

A number of variations may include a rotor core comprising: a body, wherein the body is cylindrical and includes an inner surface and an outer surface; a first end cap which extends radially from a first end of the body and a second end cap which extends radially from a second end of the body; an annular cavity defined by a portion of the outer surface of the body, an inner surface of the first end cap, and an inner surface of the second end cap; and at least one shoulder which extends axially from one of the first end cap or the second end cap constructed and arranged to accommodate at least one bearing.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 9 illustrates a perspective view of a rotor assembly with bearings according to a number of variations.

FIG. 10 illustrates an end view of a rotor assembly with bearings according to a number of variations.

FIG. 11 illustrates a section view of a rotor assembly with bearings taken along B-B of FIG. 10.

FIG. 12 illustrates a side view of a rotor core according to a number of variations.

FIG. 13 illustrates a section view of a rotor assembly with bearings according to a number of variations.

FIG. 14 illustrates a section view of an electrified turbocharger with portions removed according to a number of variations.

FIG. 15 illustrates a perspective view of a rotor assembly with bearings according to a number of variations.

FIG. 16 illustrates an end view of a rotor assembly with bearings according to a number of variations.

DETAILED DESCRIPTION OF ILLUSTRATIVE VARIATIONS

The following description of the variations is merely illustrative in nature and is in no way intended to limit the scope of the invention, its application, or uses.

Figure 1:
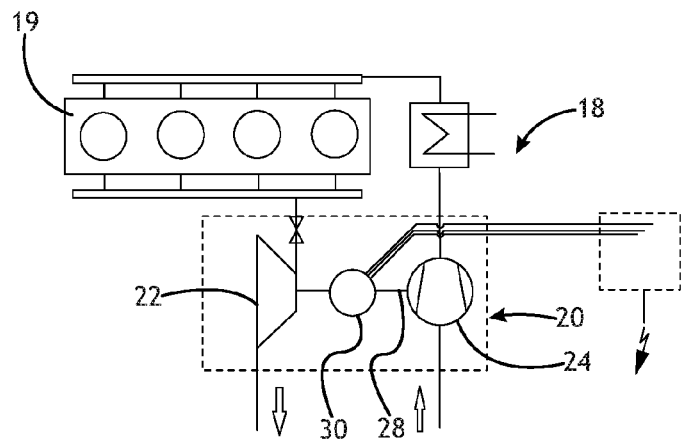
FIG. 1 illustrates a schematic of an engine breathing system according to a number of variations.
Figure 2:
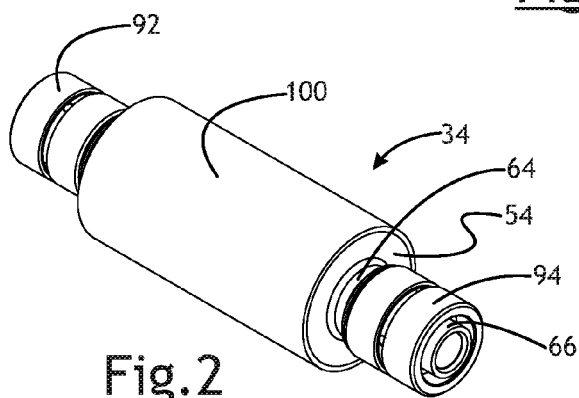
FIG. 2 illustrates a perspective view of a rotor assembly with bearings according to a number of variations.
Figure 3:
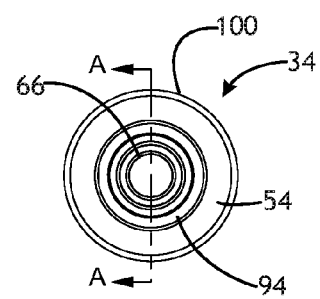
FIG. 3 illustrates an end view of a rotor assembly with bearings according to a number of variations.
Figure 4:
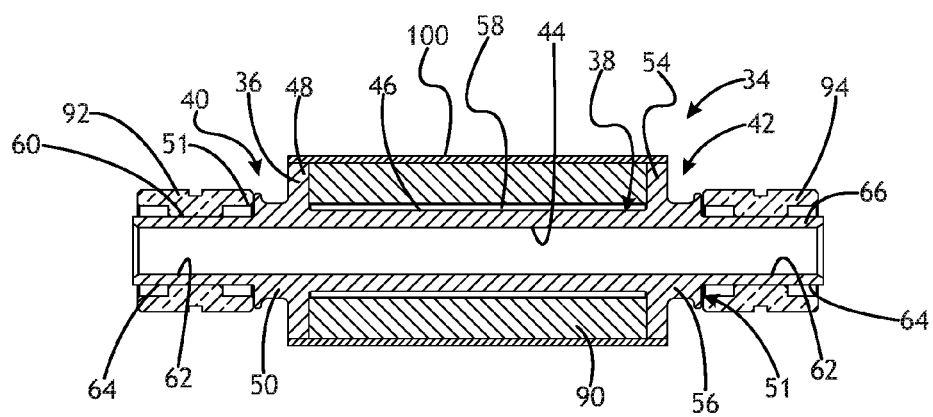
FIG. 4 illustrates a section view taken along A-A of FIG. 3.
Figure 5:
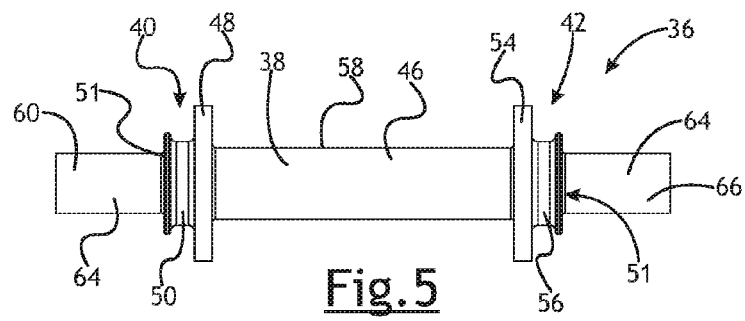
FIG. 5 illustrates a side view of a rotor core according to a number of variations.

Referring to FIG. 1, in a number of variations, an engine breathing system 18 may include electrified machinery 20 including, but not limited to, an electrified turbocharger. An electrified turbocharger 20 may include a turbine 22 which may be operatively attached to a compressor 24 via a shaft 28. The turbine 22 may be driven by exhaust gas fluid-flow which may cause the shaft 28 to rotate which may then drive the compressor 24. The compressor 24 may then pressurize air which may enter the internal combustion engine 19. In a number of variations, an electric motor 30 may be operatively attached to the shaft 28 and may selectively drive the shaft 28.

Figure 6:
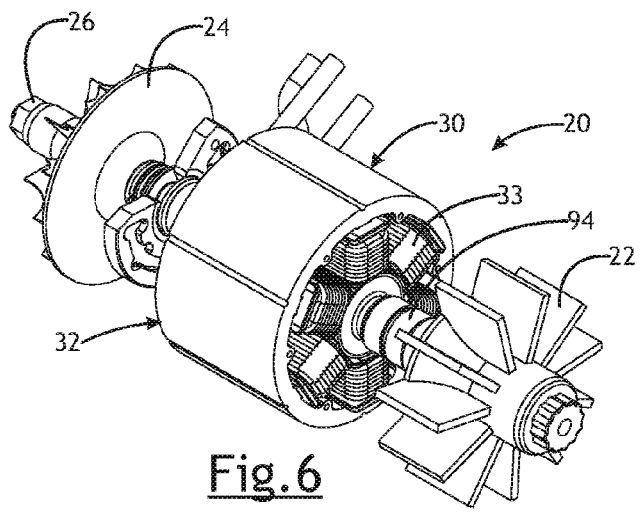
FIG. 6 illustrates a perspective view of an electrified turbocharger according to a number of variations.
Figure 7:
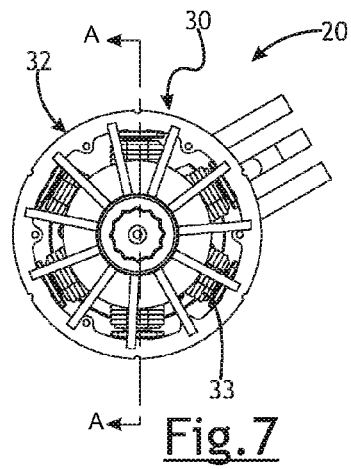
FIG. 7 illustrates an end view of an electrified turbocharger according to a number of variations.
Figure 8:
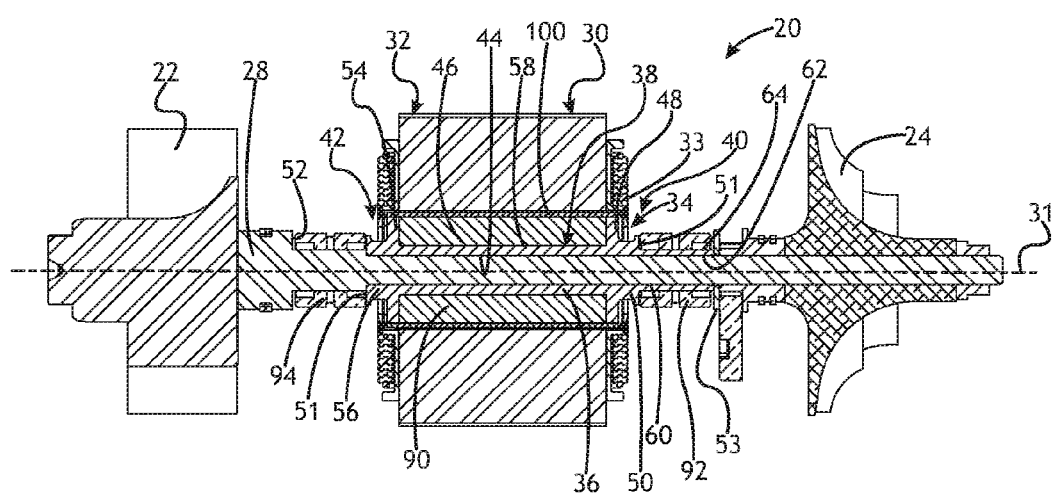
FIG. 8 illustrates a section view of an electrified turbocharger taken along A-A of FIG. 7.
Figure 17:
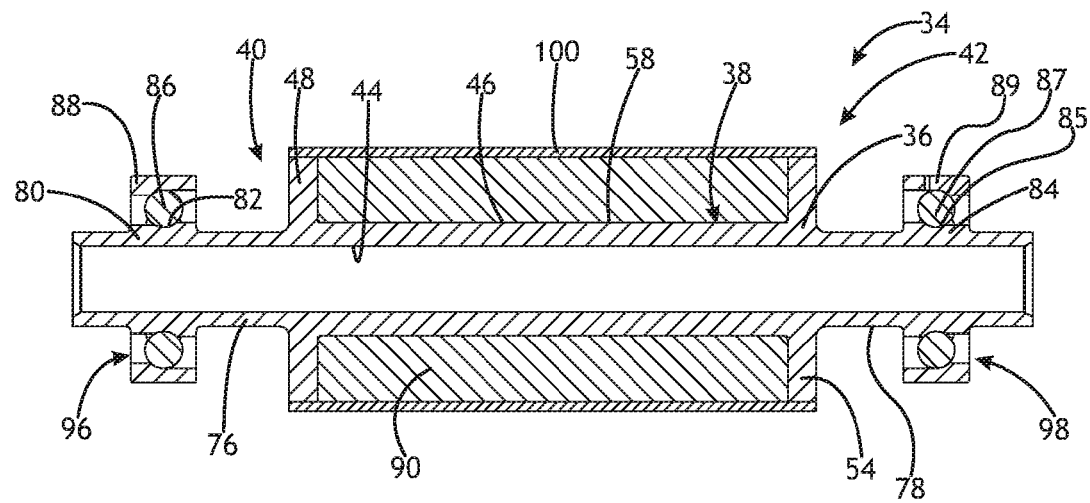
FIG. 17 illustrates a section view of a rotor assembly with bearings taken along A-A of FIG. 16.
Figure 18:
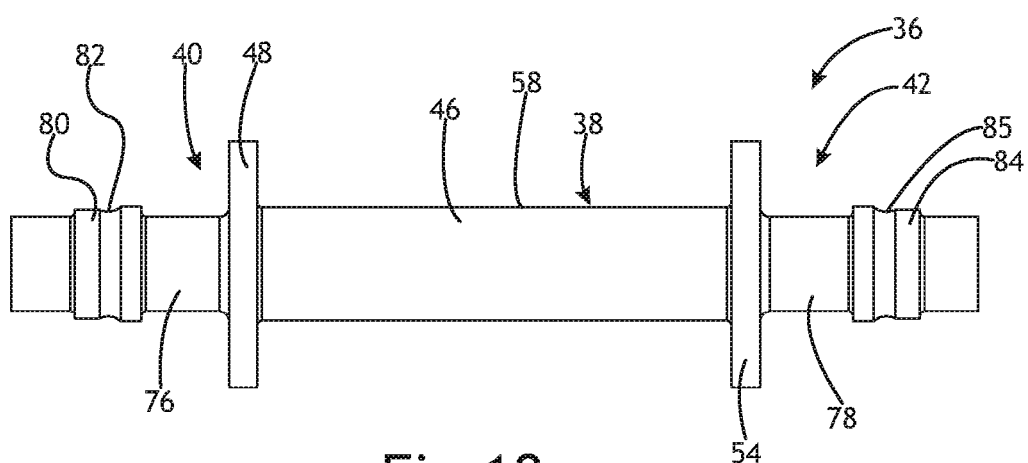
FIG. 18 illustrates a side view of a rotor core according to a number of variations.

Referring to FIGS. 6-8, in a number of variations, the electric motor 30 may comprise a rotor assembly 34 which may be driven by a stator assembly 32. The rotor assembly 34 may be coupled to the shaft 28 and may drive the shaft 28. In a number of variations, the stator assembly 32 may operate as an electromagnet which may be energized by field windings 33. The rotor assembly 34 may be rotated by the stator assembly 32 by the interaction between the field windings 33 and magnetic fields in the rotor assembly 34 which may produce a torque about an axis of rotation 31 of the rotor assembly 34. In a number of variations, one or more permanent magnets 90 may be used to provide the magnetic field.

Referring to FIGS. 2-18, in a number of variations, a rotor assembly 34 may be constructed and arranged to accommodate one or more bearings 92, 94, 96, 98 and so it may be slip fit onto the shaft 28 of a turbo machine 20 and axially clamped with the compressor nut 26 (variations of which are illustrated in FIGS. 6 and 14) which may minimize impact on assembly, tolerance stack up, and eccentricity. The term "axial" as used hereafter refers to a direction along or parallel to the axis of rotation 31 of the shaft 28 and the term "radial" used hereafter refers to a direction which extends from or is perpendicular to the axis of rotation 31 of the shaft 28.

In a number of variations, a rotor assembly 34 may include a rotor core 36 constructed and arranged to accommodate one or more magnets 90. A rotor sleeve 100 may surround and compress the one or more magnets 90. The rotor sleeve 100 may be a hollow cylinder and may be constructed and arranged to fit within a stator assembly 32, a variation of which is illustrated in FIG. 8.

In a number of variations, the rotor core 36 may include a body 38 which may be cylindrical and may include an opening defined by an inner surface 44 of the body 38 which may extend through the body 38 and which may be constructed and arranged to accommodate a shaft 28 of the turbo machine 20. The rotor core 36 may further include a first end cap 48 which may extend radially outward from a first end 40 of the body 38 adjacent the compressor 24 side of the shaft 28 and a second end cap 54 which may extend radially outward from a second end 42 of the body 38 adjacent the turbine 22 side of the shaft 28. The first end cap 48, the second end cap 54, and the outer surface 46 of the body 38 may define an annular cavity 58 which may be constructed and arranged to accommodate one or more magnets 90. In a number of variations, the first end cap 48 may include a first axial lip 50 and the second end cap 54 may include a second axial lip 56 which may each be constructed and arranged to center one or more bearings 92, 94, 96, 98, 102 with an adjacent shoulder 52 which may be on at least one of the shaft 28 and/or a washer 53, variations of which are illustrated in FIGS. 8 and 14, depending on the location of the one or more bearings 92, 94, 96, 98, 102. In a number of variations, the axial lips 50, 56 may each include a thrust surface 51 which may provide a hydrodynamic cushion between the one or more bearings 92, 94, 96, 98, 102 and the axial lips 50, 56. The rotor core 36 may comprise any number of durable high strength non-magnetic materials including, but not limited to, titanium or a steel alloy including, but not limited to, high nickel steel. The rotor core 36 may be one single continuous piece or may comprise several components attached together.

Referring to FIGS. 2-14, in a number of variations, the rotor assembly 34 may be constructed and arranged to allow for use of at least one hydrodynamic bearing 92, 94 which may increase durability of the electric motor 30 as compared to an electric motor using only rolling element bearings, and may also reduce axial tolerance stack-up.

Referring to FIGS. 2-5, in a number of variations, the rotor core 36 may include a first shoulder 60 which may extend outward from the first end cap 48 and a second shoulder 66 which may extend outward from the second end cap 54. The first shoulder 60 may be one single continuous component with at least the first end cap 48 and the second shoulder 66 may be one single and continuous component with at least the second end cap 54. The first shoulder 60 and the second shoulder 66 may each include an inner surface 62 which may be constructed and arranged to accommodate the shaft 28 and an outer surface 64 which may be constructed and arranged to act as a bearing surface for at least a first bearing 92 and a second bearing 94, respectively. The use of the first and second shoulders 60, 66 may allow for rotation of the first and second bearings 92, 90 about the first and second shoulders 60, 66 which may allow for use of a wider range of bearings including, but not limited to, hydrodynamic bearings to be axially clamped into the system 18.

Referring to FIGS. 6-12, in a number of variations, the rotor core 36 may include only the first shoulder 60 which may extend axially from the first end cap 48 and may be one single continuous component with at least the first end cap 48. At least one second bearing 102 may be adjacent the second end cap 48, including, but not limited to, a rolling element bearing which may be operatively attached to the shaft 28 so that the shaft 28 may act as the inner race of the second bearing 102. In another variation, a tube sleeve 74, a variation of which is illustrated in FIGS. 13-14, may be attached to the shaft 28 adjacent the second end cap 54 to allow for the use of a second hydrodynamic bearing 94, as will be discussed hereafter.

Referring to FIG. 13, the rotor assembly 34 may include a first tube sleeve 68 which may be adjacent to the first end cap 48 of the rotor core 36 and a second tube sleeve 74 which may be adjacent to the second end cap 54 of the rotor core 36. The first tube sleeve 68 and the second tube sleeve 74 may each include an inner surface 70 which may be constructed and arranged to accommodate the shaft 28 and an outer surface 72 which may be constructed and arranged to act as a bearing surface for at least a first bearing 92 and a second bearing 94, respectively. The first tube sleeve 68 and the second tube sleeve 74 may each be separate components from the rotor core 36. The use of the first and second tube sleeves 68, 74 may allow for rotation of the first and second bearings 92, 94 about the first and second shoulders 60, 66 which may allow for use of a wider range of bearings including, but not limited to, hydrodynamic bearings to be axially clamped to the system 18.

Referring to FIG. 14, in a number of variations, the rotor assembly 34 may include only the first tube sleeve 68. In a number of variations, a second bearing 102 including, but not limited to, a rolling element bearing may be operatively attached to the shaft 28 adjacent the second end cap 54. The shaft 28 may act as the inner race of the second bearing 98.

Referring to FIGS. 15-18, in a number of variations, the rotor core 36 may be constructed and arranged to allow for use of at least one rolling element bearing 96, 98 which may reduce tolerance stack-up. In a number of variations, the rotor core 36 may include a first shoulder 76 which may extend axially outward from the first end cap 48 and which may include a first radial protrusion 80 having a first inner race 82 for a first bearing 96 and a second shoulder 78 which may extend axially outward from the second end cap 54 and which may include a second radial protrusion 84 having a second inner race 85 for a second bearing 98. In a number of variations, the first inner race 82 and the second inner race 85 may each be ground into the first and second shoulders 76, 78, respectively. Any number of rolling element bearings 96, 98 may be used including, but not limited to, deep groove or angular contact style bearings. The rotor core 36 may be one single continuous component. The balls 86 and the outer race 88 of the first bearing 96 may then be assembled onto the first inner race 82 on the rotor core 36 and the balls 87 and the outer race 85 of the second bearing 98 may be assembled onto the second inner race 85 on the rotor core 36. A rotor core 36 having a first and a second shoulder 76, 78 is illustrated above, however, it is noted that a rotor core 36 may comprise only one of the shoulders 76, 78 having an inner race 82, 85.

It is noted that any of the above variations may be combined or rearranged without departing from the spirit or scope of the invention.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: a rotor core comprising a body, wherein the body includes an inner surface and an outer surface, a first end cap which extends radially from a first end of the body and a second end cap which extends radially from a second end of the body, wherein the first end cap, the second end cap, and the outer surface define an annular cavity; at least one sleeve adjacent at least one of the first end cap or the second end cap; at least one magnet contained within the annular cavity; and at least one bearing operatively attached to the at least one sleeve.

Variation 2 may include a product as set forth in Variation 1 wherein the at least one bearing is a hydrodynamic bearing.

Variation 3 may include a product as set forth in Variation 1 wherein the at least one bearing is a rolling element bearing.

Variation 4 may include a product as set forth in Variation 3 wherein the at least one sleeve is an inner race for the at least one bearing.

Variation 5 may include a product as set forth in any of Variations 1-4 wherein the sleeve is a shoulder which extends axially from the first end cap or the second end cap and is one single continuous component with the first end cap or the second end cap.

Variation 6 may include a product as set forth in any of Variations 1-4 wherein the sleeve is a separate component from the rotor core.

Variation 7 may include a product as set forth in any of Variations 1-6 further comprising a stator surrounding the rotor assembly, and wherein the rotor assembly is operatively attached to a shaft of a turbo machine.

Variation 8 may include a rotor assembly comprising: a rotor core comprising: a body, wherein the body is cylindrical and includes an inner surface and an outer surface; a first end cap which extends radially from a first end of the body and a second end cap which extends radially from a second end of the body; an annular cavity defined by a portion of the outer surface of the body, an inner surface of the first end cap, and an inner surface of the second end cap; at least one bearing sleeve adjacent the first end cap or the second end cap, wherein the at least one bearing sleeve is a bearing surface; at least one magnet within the annular cavity; and a rotor sleeve surrounding the annular cavity.

Variation 9 may include a rotor assembly as set forth in Variation 8 wherein the at least one bearing surface is one single continuous component with the rotor core.

Variation 10 may include a rotor assembly as set forth in Variation 8 wherein the at least one bearing sleeve is a separate component from the rotor core.

Variation 11 may include a rotor assembly as set forth in any of Variations 8-10 further comprising at least one bearing operatively attached to the at least one bearing sleeve.

Variation 12 may include a rotor assembly as set forth in Variation 11 wherein the at least one bearing is a hydrodynamic bearing.

Variation 13 may include a rotor assembly as set forth in Variation 11 wherein the at least one bearing is a rolling element bearing.

Variation 14 may include a rotor assembly as set forth in Variation 13 wherein the at least one bearing sleeve is the inner race for the rolling element bearing.

Variation 15 may include a rotor core comprising: a body, wherein the body is cylindrical and includes an inner surface and an outer surface; a first end cap which extends radially from a first end of the body and a second end cap which extends radially from a second end of the body; an annular cavity defined by a portion of the outer surface of the body, an inner surface of the first end cap, and an inner surface of the second end cap; and at least one shoulder which extends axially from one of the first end cap or the second end cap constructed and arranged to accommodate at least one bearing.

Variation 16 may include a rotor core as set forth in Variation 15 wherein the at least one shoulder is constructed and arranged to act as a bearing surface for at least one hydrodynamic bearing.

Variation 17 may include a rotor core as set forth in Variation 16 further comprising the at least one hydrodynamic bearing operatively attached to the at least one shoulder.

Variation 18 may include a rotor core as set forth in Variation 15 wherein the at least one shoulder is constructed and arranged to act as an inner race for a rolling element bearing.

Variation 19 may include a rotor core as set forth in Variation 18 further comprising operatively attaching a plurality of rolling elements and a bearing outer race to the inner race.

The above description of select variations within the scope of the invention is merely illustrative in nature and, thus, variations or variants thereof are not to be regarded as a departure from the spirit and scope of the invention.

What is claimed is:

1. A product comprising:
   a rotor core comprising a body, wherein the body includes an inner surface constructed and arranged to accommodate a shaft and an outer surface, a first end cap which extends radially from a first end of the body and a second end cap which extends radially from a second end of the body, wherein the first end cap, the second end cap, and the outer surface define an annular cavity;
   at least one magnet contained within the annular cavity;
   at least one bearing surface component adjacent at least one of the first end cap or the second end cap which extends axially outward from an outer surface of at least one of the first end cap or the second end cap, wherein the bearing surface component is a shoulder which extends axially from the first end cap or the second end cap and is one single continuous component with the first end cap or the second end cap; and
   at least one bearing operatively attached to the at least one bearing surface component.

2. The product of claim 1 wherein the at least one bearing is a hydrodynamic bearing.

3. The product of claim 1 wherein the at least one bearing is a rolling element bearing.

4. The product of claim 1 wherein the at least one bearing surface component is an inner race for the at least one bearing.

5. The product of claim 1 further comprising a stator surrounding the rotor assembly, and wherein the rotor assembly is operatively attached to the shaft, and wherein the shaft is part of a turbo machine.

6. The product of claim 1 wherein at least one of the first end cap or the second end cap further comprises an axial lip constructed and arranged to position the at least one bearing.

7. A rotor assembly comprising:
a rotor core comprising: a body, wherein the body is cylindrical and includes an inner surface and an outer surface, wherein the inner surface is constructed and arranged to accommodate a shaft; a first end cap which extends radially from a first end of the body and a second end cap which extends radially from a second end of the body; an annular cavity defined by a portion of the outer surface of the body, an inner surface of the first end cap, and an inner surface of the second end cap;
at least one bearing sleeve which extends axially from an outer surface of the first end cap or the second end cap, wherein the at least one bearing sleeve is one single continuous component and is an inner running surface for a hydrodynamic bearing;
at least one magnet within the annular cavity; and
a rotor sleeve surrounding the annular cavity.

8. The rotor assembly of claim 7 wherein the at least one bearing sleeve is one single continuous component with the rotor core.

9. The rotor assembly of claim 7 wherein the at least one bearing sleeve is a separate component from the rotor core.

10. The rotor assembly of claim 7 further comprising at least one hydrodynamic bearing operatively attached to the at least one bearing sleeve.

11. The rotor assembly of claim 7 wherein at least one of the first end cap or the second end cap further comprises an axial lip having a thrust surface for at least one bearing.

12. A rotor core comprising:
a body, wherein the body is cylindrical and includes an inner surface constructed and arranged to accommodate a shaft and an outer surface;
a first end cap which extends radially from a first end of the body and a second end cap which extends radially from a second end of the body;
an annular cavity defined by a portion of the outer surface of the body, an inner surface of the first end cap, and an inner surface of the second end cap; and
at least one shoulder which extends axially from an outer surface of one of the first end cap or the second end cap and is one single continuous component with the first end cap or the second end cap and which is constructed and arranged to act as an inner bearing surface.

13. The rotor core of claim 12 wherein the bearing surface is an inner running surface for at least one hydrodynamic bearing.

14. The rotor core of claim 13 further comprising the at least one hydrodynamic bearing operatively attached to the at least one shoulder.

15. The rotor core of claim 12 wherein the inner bearing surface is an inner race for a rolling element bearing.

16. The rotor core of claim 15 further comprising operatively attaching a plurality of rolling elements and a bearing outer race to the inner race.

17. The rotor core of claim 12 wherein at least one of the first end cap or the second end cap further comprises an axial lip which extends away from the body.

* * * * *